July 13, 1943. BERTELI STELZER, NOW BY MARRIAGE BERTELI STELZER SHATTOCK Re. 22,349

BOOSTER FOR HYDRAULIC BRAKING SYSTEMS

Original Filed Dec. 9, 1939

INVENTOR.

Berteli Stelzer

Reissued July 13, 1943

Re. 22,349

UNITED STATES PATENT OFFICE 22,349

BOOSTER FOR HYDRAULIC BRAKING SYSTEMS

Berteli Stelzer, now by marriage Berteli Stelzer Shattock, St. Petersburg, Fla., assignor to William Stelzer, Detroit, Mich.

Original No. 2,260,492, dated October 28, 1941, Serial No. 308,367, December 9, 1939. Application for reissue October 20, 1942, Serial No. 462,775

12 Claims. (Cl. 188—152)

Figures 1, 2:
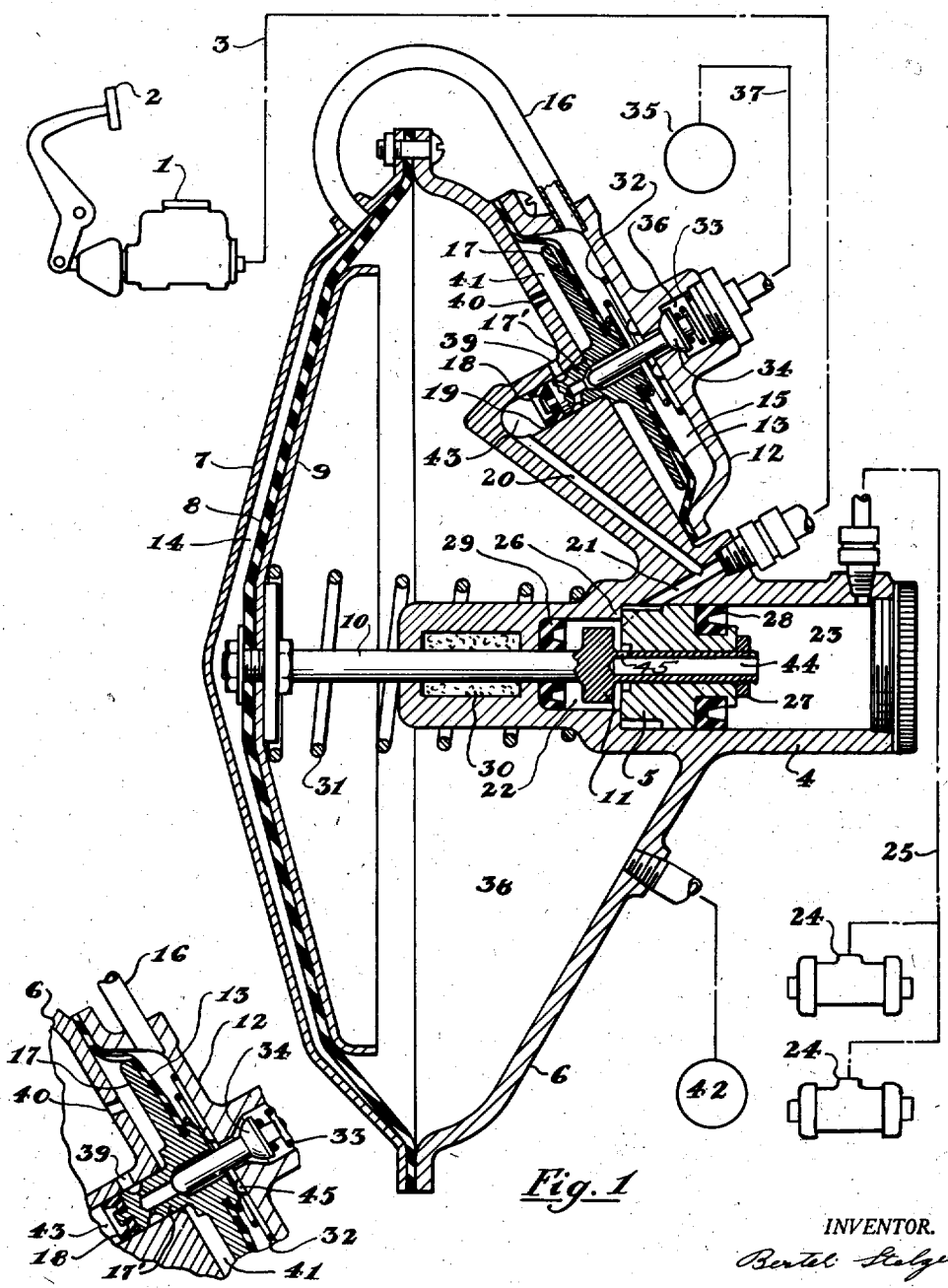

The invention relates to hydraulic braking systems and more particularly to a power booster system for hydraulic brakes, where the booster is controlled by the hydraulic pressure produced by the master cylinder and the fluid pressure of the fluid that serves as power to actuate the booster. The invention is related to one for which I have filed a patent application June 27, 1939, Serial No. 281,375.

The object of the invention is to provide a power booster where the boosted pressure is in a given proportion to the primary pressure as produced by the master cylinder and to obtain this feature at the least expense in manufacture as well as installation of the power booster.

Another object is to provide novel means for controlling the power directed to the power booster, to use the primary pressure from the master cylinder urging the admission of power to the booster, and the fluid pressure in the booster to oppose the admission. This results in a simplification of construction as well as a number of minor advantages which will become apparent in the description.

A further aim is to obtain a construction that can be used in any fluid pressure system, using a higher pressure as a means of power, be it a source of air pressure from an air pump, atmospheric pressure against a vacuum produced by an internal combustion engine or vacuum pump, or be it oil pressure produced by an oil pump.

Other features and advantages will become apparent upon inspection of the drawing, wherein:

Fig. 1 is a sectional elevation of the improved booster in combination with a diagram of the hydraulic brake system; and Fig. 2, a fragmentary sectional view of the valve mechanism in a position where power is directed to the booster.

Describing the invention now more in detail, there is shown a conventional master cylinder or pressure producing means 1 operated with a foot pedal 2 by the operator to produce a primary pressure in the primary line 3 leading to the power booster which consists in its main components of a hydraulic cylinder 4 with a piston 5 sliding therein to serve as a pressure increasing device, a power cylinder or expansible motor mechanism composed of a shell 6 extending from cylinder 4, a shell 7 and a diaphragm 8 acting on a diaphragm piston plate 9 secured to piston rod 10 engaging said piston 5 through a shoulder or collar 11. Another main part of the power booster is the valve mechanism which in this embodiment is mounted to shell 6 and consists of a housing 12 clamping down a diaphragm 13 responsive to the fluid pressure in chamber 14 of the power cylinder which is in communication with chamber 15 through tube 16. The diaphragm 13 acts against a diaphragm piston 17 having co-axial therewith a hydraulic piston 17' provided with a seal 18 sliding in a cylinder bore 19 which is in communication with the primary line 3 through passage 20. Another passage 21 provdes communication between line 3 and the low pressure chamber 22 of the pressure increasing device. This is to impose the primary pressure on the secondary pressure in chamber 23 which communicates with the conventional wheel cylinders 24 through the secondary or hydraulic brake line 25. In the "off" position, as illustrated in Fig. 1, piston 5 rests against recess 26, whereas piston rod 10, whose one end slides in piston 5 a short distance, limited by a stop nut 27, allows communication between chambers 22 and 23 through port 45 and passage 44. Piston 5 is provided with a piston seal 28. Chamber 22 is sealed against the power cylinder by a seal 29. To keep the piston rod clean and lubricated I provide a chamber 30 filled with a wick saturated with hydraulic brake fluid or oil. A spring 31 yieldingly urges the pistons into the "off" position. The valve mechanism is also shown in the "off" position. It is urged into that position by a conical spring 32 and by the valve spring 33 which seats valve 34 to shut off the source of power 35 consisting of a supply of fluid under pressure in communication with chamber 36 through line 37. The lower extremity of valve 34 is unseated in the "off" position so that there is communication between low pressure chamber 38 and power cylinder chamber 14 through passage 39, through the small drilled holes in piston or plunger 17', chamber 15, and tube 16. A hole 40 serves to provide communication between chamber 41 and low pressure chamber 38, which is connected with the source of low pressure 42. By low pressure I refer to a pressure lower than the pressure of the source of power 35. Thus, if the latter has a pressure above atmospheric, 42 may be at atmospheric pressure, and if 35 is at atmospheric pressure, 42 may designate a source of vacuum. In the latter case, some question may arise as to what may be the source of power, however, in this description I shall consider 35 as the source of power, even though 42 may be a vacuum pump or the intake manifold of an internal combustion engine.

In operation, assuming the hydraulic booster in the "off" position as shown in Fig. 1, and that the operator depresses foot pedal 2 to actuate the master cylinder 1, a primary pressure is produced in line 3 and communicated to chambers 22, 23, 43, and the wheel cylinders 24. Due to the low pressure required to expand the brake shoes before they come into contact with the drums the pressure does not build up, the hydraulic pressure acting on piston 17' may be sufficient to overcome spring 32 and thereby close off the low pressure chamber 38 from chambers 15 and 14 when the piston seats against valve 34, but the pressure is not sufficient to compress valve spring 33 to lift valve 34. Thus no power is directed to the expansible motor mechanism. By further depression of the foot pedal 2 fluid flows from the master cylinder through line 3, passage 21, chamber 22, hole 44, and brake line 25 to the wheel cylinders 24, until the brake shoes begin to engage the brake drums and the resistance builds up. Further depression of the brake pedal by the operator is accompanied by an increase in hydraulic pressure which now overcomes spring 33 and lifts valve 34 to allow fluid under pressure from the source of power 35 into chamber 15 to be directed to chamber 14 of the power cylinder. Thus the fluid acting on the diaphragm forces diaphragm piston 9 and with it piston rod 10 towards the hydraulic booster cylinder whereby the shoulder 11 picks up piston 5 and at the same time closes the hydraulic passage between the primary line 3 and chamber 23. Thus the pressure is increased in chamber 23, amounting to the primary pressure in chamber 22 plus the pressure super-imposed by the expansible motor mechanism. In the meantime the fluid pressure in chamber 15 acting on diaphragm 13 and piston plate 17 has been opposing the hydraulic piston 17' so as to let in only a certain amount of fluid under pressure commensurate with the exertion on the foot pedal 2 and primary pressure. The position of the valve mechanism when admitting power is shown in Fig. 2. The excursion is limited by small projections 45 so that the fluid can still pass.

In the holding position, where the exertion on the foot pedal is neither decreased nor increased, the valve 34 is seated not only against the seat in the piston 17' but also the seat in housing 12, shutting off the low pressure as well as the high pressure from source 35.

Supposing now that the operator releases his foot from the brake pedal to release the brakes, the resulting fall in the primary pressure causes piston 17' to yield to the fluid pressure in chamber 15, whereby valve 34 unseats itself from piston 17' and allows the fluid in chambers 14 and 15 to escape into chamber 38 and from there to the source of low pressure 42. This relieves the pressure on piston 9, and spring 31 returns it to the "off" position, unseating collar 11 again from piston 5 to allow the brake shoes to contract completely and return the hydraulic fluid to the master cylinder.

It is important and desirable to maintain approximately the same booster ratio during the application of the brakes to give the operator the "feel" of the brakes and at the same time to be economical with the expenditure of power. I have found that certain types of vehicles require a booster ratio of not more than 1:2, whereas in others where the weight is greater and the brakes are larger a booster ratio of 1:4 is more satisfactory.

Assuming that a booster is to be constructed giving a booster ratio of 1:3, where the pressure in the primary line is one third of the pressure in the secondary line, and neglecting the displacement of piston rod 10 and the action of the various springs, then the ratio between the area of piston 5 and the effective area of diaphragm 8 should be twice the ratio between the area of piston 17' and the effective area of diaphragm 13, thus if the effective area of diaphragm 8 is 60 times the area of piston 5, the effective area of diaphragm 13 must be 30 times as large as the area of piston 17'. If the displacement of piston rod 10 is to be considered, the ratio between the area of piston rod 10 and piston 5 must be added to the booster ratio of the expansible motor mechanism. Using actual figures for example, and assuming the hydraulic pressure in the primary line to be 100 lbs. per square inch, so that the desired pressure in the wheel cylinders is 300 lbs. per square inch, and assuming that piston 5 has 1 square inch and rod 10 an area of .1 square inch, then the pressure imposed by the primary pressure on the secondary pressure is 90 lbs., the booster ratio is 2.1, and the proportion between the effective area of diaphragm 8 and piston 5, 2.1 times as great as the proportion between the effective area of diaphragm 13 and piston 17'. Thus assuming that diaphragm 8 has 60 square inches, and piston 17' .42 square inch, the required area of diaphragm 13 would be $$\frac{60\times.42}{2.1}=12 \text{ square inches}$$

Due to the springs and internal resistance the booster ratio is somewhat lower. When the maximum power is reached where there is no more reserve the overall booster ratio does not increase any further, but drops off with increased pedal pressure.

In order not to encumber the drawing, the booster mechanism has been illustrated in the position shown, but it is apparent that it may be mounted in a vehicle with the hydraulic cylinder at the top, or in any other position as long as bleeding does not become too difficult. Since there are no other than pipe connections, the booster unit may be placed or mounted at any convenient place in the vehicle.

I wish to make it clearly understood, that by the term "booster," I mean to designate a device which serves to boost or increase the hydraulic pressure of the braking system, i. e., serving as a helper, whereby the primary or master cylinder pressure is not increased. Thus I wish to discriminate between "booster" and "power brake," as my invention does not apply to the latter. In the novel booster a proportional part of the work is performed by the operator by means of the master cylinder while said booster is in operation.

While one illustrative embodiment has been shown, it is apparent that the invention may be carried out in many ways different from that shown, and therefore I do not wish to be limited in the application or in the construction to the particular embodiment except as by the scope of the appended claims.

I claim:

1. In a hydraulic braking system having a master cylinder to produce a primary pressure, and wheel cylinders to be actuated by a secondary pressure, a fluid pressure line connected to the master cylinder, and a fluid pressure line connected to the wheel cylinders, a pressure booster comprising a pressure increasing device having a primary pressure side communicating with the first named fluid pressure line and a secondary pressure side communicating with the second named fluid pressure line, a differential fluid pressure motor to actuate said pressure increasing device, said pressure booster being constructed and arranged to utilize pressure in the master cylinder for performing part of the work to apply the brakes while said secondary pressure is higher than said primary pressure, control valve means for said motor, means responsive to said primary pressure to actuate said control valve means to connect said motor to a source of pressure differential, and means directly responsive to differential pressures in opposite ends of said motor to oppose said last named means, to tend to reduce differential pressures in said motor, said pressure booster forming a self-contained unit wholly separate from the master cylinder and the wheel cylinders and connected thereto solely by said fluid pressure lines, said pressure booster being so constructed as to afford communication between said secondary pressure side and said primary pressure side when pressure in the latter is higher than in said secondary pressure side.

2. In a hydraulic braking system having a master cylinder for producing a primary pressure, wheel cylinders to be actuated by a secondary pressure, a fluid pressure line connected to the master cylinder, and a fluid pressure line connected to the wheel cylinders, a pressure booster comprising a pressure increasing device having a primary pressure side communicating with the first named fluid pressure line and a secondary pressure side communicating with the second named fluid pressure line, an expansible motor for actuating the pressure increasing device, said pressure booster being constructed and arranged for utilizing said primary pressure to assist said motor in increasing said secondary pressure while the latter is higher than said primary pressure, valve means for controlling pressures in said motor, pressure sensitive means responsive to said primary pressure to actuate said valve means to connect said motor to a source of pressure differential, pressure sensitive means comprising a diaphragm directly responsive to differential pressures in opposite ends of said motor to oppose said last named means, to tend to reduce differential pressures in said motor, said two opposing pressure sensitive means being proportioned to produce an increase in said secondary pressure which is proportional to the primary pressure in a predetermined ratio, and means yieldingly urging said valve means to a motor-deenergizing position, said pressure booster forming a single self-contained unit separate from the master cylinder and the wheel cylinders and connected thereto solely by said fluid pressure lines, said pressure booster being so constructed as to afford communication between said secondary pressure side and said primary pressure side when pressure in the latter is higher than in said secondary pressure side.

3. In a hydraulic braking system having a master cylinder for producing a primary pressure, and wheel cylinders to be actuated by secondary pressure, a pressure booster comprising a booster cylinder one end of which is a primary pressure chamber communicating with the master cylinder and the other end of which is a secondary pressure chamber communicating with the wheel cylinders, a piston in said booster cylinder, a motor having a power responsive unit including a rod axially aligned with said piston, said rod and said piston being constructed to cooperate with each other to afford communication between said chambers when said motor is deenergized and to close such communication when said motor is energized, the communication between said chambers when said motor is deenergized being such as to afford relatively unimpeded flow of hydraulic fluid from one of said chambers to the other, said rod and said piston being so constructed and arranged that said rod actuates said piston after initial energization of said motor, and a control mechanism for said motor for causing energization thereof to generate a secondary pressure substantially proportional to said primary pressure.

4. In a hydraulic braking system having a master cylinder for producing a primary pressure, and wheel cylinders to be actuated by a secondary pressure, a pressure booster comprising a booster cylinder one end of which is a primary pressure chamber communicating with the master cylinder and the other end of which is a secondary pressure chamber communicating with the wheel cylinders, a piston in said booster cylinder, a differential fluid pressure motor having a pressure responsive unit including a rod axially movable in axial alignment with said piston, said rod having a portion engageable with said piston to move the latter toward the second named end of said booster cylinder upon energization of said motor, said piston and said rod being constructed to afford communication between said chambers when said motor is deenergized, said communication being such as to afford relatively unimpeded flow of hydraulic fluid from one of said chambers to the other, said rod portion, when in engagement with said piston, closing communication between said chambers, and a control valve mechanism for said motor operative for controlling differential pressures in said motor to effect movement of said piston to generate a secondary pressure substantially proportional to the primary pressure.

5. In a hydraulic braking system having a master cylinder for producing a primary pressure, and wheel cylinders to be actuated by a secondary pressure, a pressure booster comprising a booster cylinder one end of which is a primary pressure chamber communicating with the master cylinder and the other end of which is a secondary pressure chamber communicating with the wheel cylinders, a piston in said booster cylinder, a differential fluid pressure motor having a pressure responsive unit including a rod axially movable in axial alignment with said piston, said rod having a portion engageable with said piston to move the latter toward the second named end of said booster cylinder upon energization of said motor, said piston and said rod being constructed to cooperate with each other to afford communication between said chambers when said motor is deenergized, said communication being such as to afford relatively unimpeded flow of hydraulic fluid from one of said chambers to the other, said rod portion, when in engagement with said piston, closing communication between said chambers, and a control valve mechanism for said motor constructed and arranged to be responsive to said primary pressure and to the fluid pressure affecting said motor whereby energization of said motor effects movement of said piston to generate a secondary pressure proportional to the primary pressure.

6. In a hydraulic braking system having a master cylinder for producing a primary pressure, and wheel cylinders to be actuated by a secondary pressure, a pressure booster comprising a booster cylinder one end of which is a primary pressure chamber communicating with the master cylinder and the other end of which is a secondary pressure chamber communicating with the wheel cylinders, a piston in said booster cylinder, a differential fluid pressure motor having a pressure responsive unit including a rod axially movable in axial alignment with said piston, said rod having a portion engageable with said piston to move the latter toward the second named end of said booster cylinder upon energization of said motor, said piston and said rod being constructed to afford communication between said chambers when said motor is deenergized, said rod portion, when in engagement with said piston, closing communication between said chambers, and a control valve mechanism for said motor normally operative for balancing pressures therein, said valve mechanism comprising a pressure sensitive element responsive to said primary pressure for closing communication between the ends of said motor and connecting one end of said motor to a source of pressure differential to effect actuation of said piston to increase the secondary pressure, and a diaphragm device responsive to differential pressures in said motor for opposing movement of said pressure sensitive element.

7. In a hydraulic braking system having a master cylinder to produce a primary pressure, and wheel cylinders to be actuated by a secondary pressure, a pressure booster comprising a differential fluid pressure motor having a pressure responsive unit including an axial rod, a booster cylinder rigidly carried by said motor axially thereof and into one end of which said rod extends, a piston mounted in said booster cylinder and having lost motion connection with said rod, said end of said booster cylinder communicating with the master cylinder, the other end of said booster cylinder being a pressure chamber and communicating with the wheel cylinders, said rod and said piston being constructed and arranged with respect to each other to afford communication between the ends of said booster cylinder when said motor is deenergized, and to close such communication when the motor is energized whereby fluid entering the first named end of said booster cylinder upon operation of the master cylinder will act against the corresponding end of said piston to assist said motor in moving said piston, and a control valve mechanism for controlling the energization of said motor.

8. In a hydraulic braking system having a master cylinder to produce a primary pressure, and wheel cylinders to be actuated by a secondary pressure, a pressure booster comprising a differential fluid pressure motor having a pressure responsive unit including an axial rod, a booster cylinder rigidly carried by said motor axially thereof and into one end of which said rod extends, a piston mounted in said booster cylinder and having lost motion connection with said rod, said end of said booster cylinder communicating with the master cylinder, the other end of said booster cylinder being a pressure chamber and communicating with the wheel cylinders, said rod and said piston being constructed and arranged with respect to each other to afford communication between the ends of said booster cylinder when said motor is deenergized, and to close such communication when the motor is energized whereby fluid entering the first named end of said booster cylinder upon operation of the master cylinder will act against the corresponding end of said piston to assist said motor in moving said piston, and a control valve mechanism for said motor comprising a piston element subject to master cylinder pressures, and an opposing diaphragm element subject to differential pressures in said motor.

9. In a hydraulic braking system having a master cylinder to produce a primary pressure, and wheel cylinders to be actuated by a secondary pressure, a pressure booster comprising a differential fluid pressure motor having a pressure responsive unit including an axial rod, a booster cylinder rigidly carried by said motor axially thereof and into one end of which said rod extends, a piston mounted in said booster cylinder and having lost motion connection with said rod, said end of said booster cylinder communicating with the master cylinder, the other end of said booster cylinder being a pressure chamber and communicating with the wheel cylinders, said rod and said piston being constructed and arranged with respect to each other to afford communication between the ends of said booster cylinder when said motor is deenergized, and to close such communication when the motor is energized whereby fluid entering the first named end of said booster cylinder upon operation of the master cylinder will act against the corresponding end of said piston to assist said motor in moving said piston, and a control valve mechanism for said motor comprising a valve piston mounted in said motor, said motor being provided with a fluid passage through which said valve piston is subjected to master cylinder pressures to be moved to connect said motor to a source of pressure differential, a diaphragm housing carried by said motor, and a diaphragm in said housing connected to said valve piston and subject to differential pressures affecting said motor to oppose such movement of said valve piston.

10. In a hydraulic braking system having a master cylinder to produce a primary pressure, and wheel cylinders to be actuated by a secondary pressure, a pressure booster comprising a differential fluid pressure motor having a pressure responsive unit including an axial rod, a booster cylinder rigidly carried by said motor axially thereof and into one end of which said rod extends, a piston mounted in said booster cylinder and having lost motion connection with said rod, said end of said booster cylinder communicating with the master cylinder, the other end of said booster cylinder being a pressure chamber and communicating with the wheel cylinders, said rod and said piston being constructed and arranged with respect to each other to afford communication between the ends of said booster cylinder when said motor is deenergized, and to close such communication when the motor is energized whereby fluid entering the first named end of said booster cylinder upon operation of the master cylinder will act against the corresponding end of said piston to assist said motor in moving said piston, and a control valve mechanism for said motor comprising a valve piston normally positioned to connect the ends of said motor to each other to balance pressures therein and operable by master cylinder pressures to close communication between the ends of said motor, a valve element normally in closed position and movable by said valve piston to open position to connect one end of said motor to a source of pressure differential to operate said piston, and a diaphragm subject to pressures in the ends of said motor and operable when said end of said motor is connected to said source to oppose movement of said valve piston from normal position.

11. In a hydraulic braking system having a master cylinder operated by the operator to produce a primary pressure, and wheel cylinders to be actuated by a secondary pressure, a pressure booster comprising a pressure increasing device having a primary pressure side in communication with said master cylinder and a secondary pressure side in communication with said wheel cylinders, an expansible motor to actuate said pressure increasing device to increase the secondary pressure, said booster being so constructed and arranged that said primary pressure performs part of the work to apply the brakes, a source of pressure for operating said motor, valve means to control differential pressures in said motor and normally connecting the ends of said motor to each other, hydraulic pressure sensitive means responsive to said primary pressure to actuate said valve means to first disconnect the ends of said motor from each other and then connect one end of said motor to said source, fluid pressure sensitive means having opposite sides responsive to pressures in the respective ends of the motor and arranged to oppose said last named means, to tend to disconnect said end of said motor from said source and then connect it to the other end of said motor to balance pressures in said motor, and means yieldingly urging said booster to its "off" position.

12. In a hydraulic braking system having a master cylinder operated by the operator to produce a primary pressure, and wheel cylinders to be actuated by a secondary pressure, a pressure booster comprising a pressure increasing device having a primary pressure side in communication with said master cylinder and a secondary pressure side in communication with said wheel cylinders, an expansible motor to actuate said pressure increasing device to increase the secondary pressure, said booster being so constructed and arranged that said primary pressure performs part of the work to increase said secondary pressure, a source of fluid pressure, valve means to control differential pressures in said motor and normally connecting the ends of said motor to each other, hydraulic pressure sensitive means responsive to said primary pressure to actuate said valve means to disconnect the ends of said motor from each other and connect one end of said motor to said source, diaphragm type fluid pressure sensitive means responsive to the pressures in the respective ends of said motor and arranged to oppose said last named means, to tend to reduce the power of said motor and to thereby tend to decrease the booster action with a consequent decrease in the secondary pressure, said two opposing pressure sensitive means being proportioned to produce a predetermined proportional increase in said secondary pressure, means yieldingly urging said valve means to a position to disconnect said source from the expansible motor, and means yieldingly urging said booster to its "off" position, said pressure booster consisting of said pressure increasing device, said valve means, said pressure responsive means, and said expansible motor, forming a single, self-contained unit, connected with the rest of the braking system by fluid pressure lines.

BERTELI STELZER SHATTOCK,
*Berteli Stelzer, now by marriage Berteli Stelzer Shattock.*